United States Patent
Clow

(10) Patent No.: US 9,049,515 B2
(45) Date of Patent: Jun. 2, 2015

(54) WIRELESS COMMUNICATION DEVICE

(71) Applicant: Keith Allen Clow, Los Angeles, CA (US)

(72) Inventor: Keith Allen Clow, Los Angeles, CA (US)

(*) Notice: Subject to any disclaimer, the term of this patent is extended or adjusted under 35 U.S.C. 154(b) by 211 days.

(21) Appl. No.: 13/647,055

(22) Filed: Oct. 8, 2012

(65) Prior Publication Data

US 2014/0098983 A1 Apr. 10, 2014

(51) Int. Cl.
*H04R 25/00* (2006.01)
*H04R 1/10* (2006.01)
*H04M 1/60* (2006.01)
*H04M 1/02* (2006.01)

(52) U.S. Cl.
CPC ............... *H04R 1/1066* (2013.01); *H04R 1/10* (2013.01); *H04R 1/1091* (2013.01); *H04M 1/0283* (2013.01); *H04M 1/6066* (2013.01)

(58) Field of Classification Search
CPC ........ H04R 25/02; H04R 25/55; H04R 25/60; H04R 25/552; H04R 25/554; H04R 25/556; H04R 2225/021; H04R 2225/55; H04R 2225/63; H04R 2225/77; H04R 1/105; H04R 1/1066
USPC .................................. 381/312–331, 370–384
See application file for complete search history.

(56) References Cited

U.S. PATENT DOCUMENTS

| | | | |
|---|---|---|---|
| 5,430,801 A * | 7/1995 | Hill .............................. | 381/322 |
| D372,312 S * | 7/1996 | Lange .......................... | D24/174 |
| 5,828,757 A * | 10/1998 | Michalsen et al. ............ | 381/328 |
| 7,110,562 B1 * | 9/2006 | Feeley et al. .................. | 381/322 |
| 7,536,150 B2 * | 5/2009 | Ryann .......................... | 455/3.06 |
| 7,539,525 B2 | 5/2009 | Kim | |
| 7,684,579 B2 * | 3/2010 | Ochsenbein et al. ......... | 381/324 |
| 7,715,888 B2 | 5/2010 | Ko | |
| 8,086,288 B2 * | 12/2011 | Klein ........................... | 455/575.2 |
| 8,331,594 B2 * | 12/2012 | Brimhall et al. .............. | 381/322 |
| 8,442,252 B2 * | 5/2013 | Meosky et al. ............... | 381/324 |
| 8,660,658 B2 * | 2/2014 | Walsh et al. .................... | 607/57 |
| 8,798,294 B2 * | 8/2014 | Havenith et al. .............. | 381/314 |
| 2002/0172386 A1 * | 11/2002 | Bayer .......................... | 381/330 |
| 2003/0231783 A1 * | 12/2003 | Kah, Jr. ......................... | 381/322 |
| 2007/0058831 A1 * | 3/2007 | Rie ............................... | 381/374 |
| 2009/0098913 A1 * | 4/2009 | Lewis ......................... | 455/569.1 |
| 2009/0103765 A1 * | 4/2009 | Bruckhoff et al. ............ | 381/381 |
| 2009/0123000 A1 * | 5/2009 | Wright ............................ | 381/59 |
| 2009/0202096 A1 * | 8/2009 | Ryann .......................... | 381/374 |
| 2010/0197227 A1 * | 8/2010 | Heo et al. ...................... | 455/41.2 |
| 2010/0232612 A1 * | 9/2010 | Basseas et al. .................. | 381/60 |

(Continued)

*Primary Examiner* — Matthew Eason
(74) *Attorney, Agent, or Firm* — Smyrski Law Group, A P.C.

(57) ABSTRACT

A wearable wireless communication device is provided, including a behind-the-ear main electronics enclosure housing wireless communication electronics, a main electronics enclosure mount engaging the behind-the-ear main electronics enclosure, an ear mount fitting the main electronics enclosure mount, and a decorative mount including a speaker. The decorative mount attaches to the ear mount which is configured to fit over an ear of a wearer. Signals are transmitted from the main electronics enclosure to the main electronics enclosure mount, to the ear mount, and to the speaker in the decorative mount. Audio from the speaker is provided to the ear of the user. Pierced ear and non-pierced ear versions are provided, wherein the ear mount for the non-pierced ear version includes a clip that clips to the wearer's ear lobe. The pierced ear version includes a conductive post that passes through a piercing in the wearer's ear.

22 Claims, 15 Drawing Sheets

(56) References Cited

U.S. PATENT DOCUMENTS

| | | | |
|---|---|---|---|
| 2012/0308069 A1* | 12/2012 | Stott | 381/380 |
| 2013/0136279 A1* | 5/2013 | Brown et al. | 381/151 |
| 2013/0287241 A1* | 10/2013 | Prelogar et al. | 381/381 |
| 2014/0193011 A1* | 7/2014 | Parker | 381/326 |

* cited by examiner

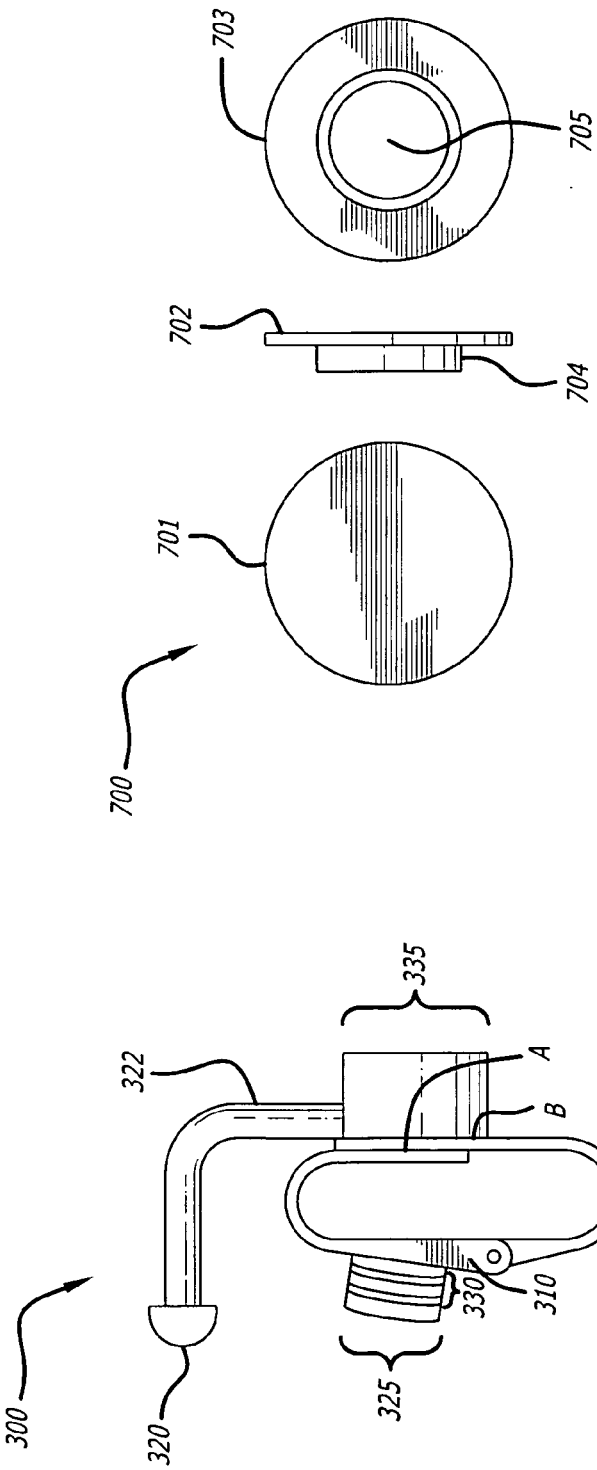

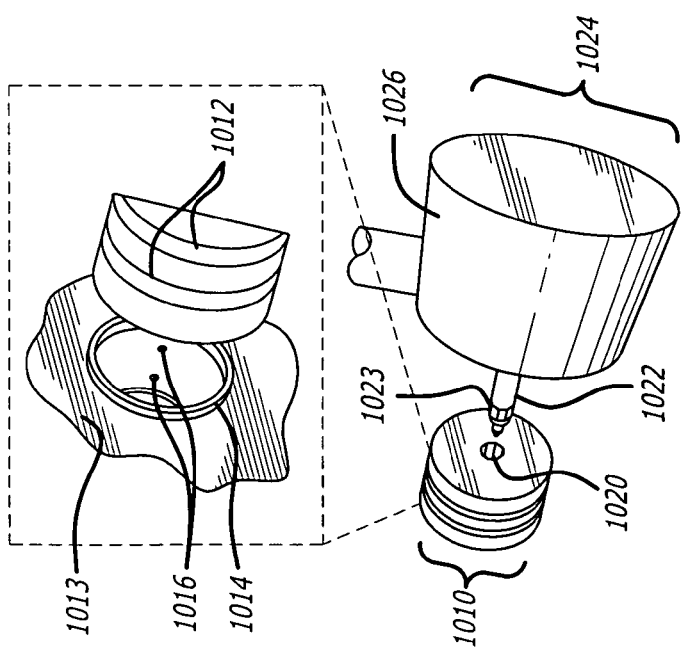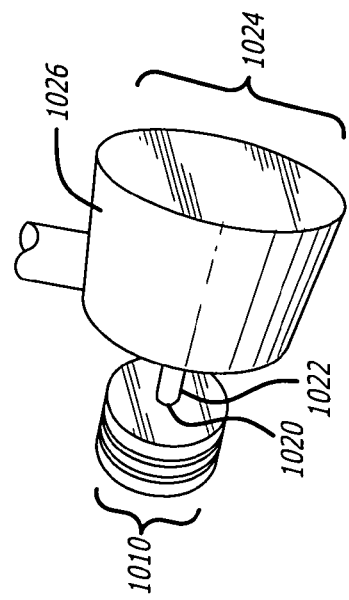

WIRELESS COMMUNICATION DEVICE

BACKGROUND OF THE INVENTION

1. Field of the Invention

The present invention relates generally to wireless devices, and more specifically to wearable wireless devices that transmit and receive wireless information and cause minimal stress to the wearer's ear region.

2. Description of the Related Art

Today's computer and cellular radio marketplace is filled with a proliferation of portable electronic devices, such as cellular phones, laptop, notebook and tablet computing devices, where hands-free operation is desirable. In general, today's portable electronic devices are delivered to customers equipped with a digital wireless networking communications facilities, such as IEEE 802.15, IEEE 802.11, "a, b, g, and n" modulation techniques, Bluetooth, and infrared. Networked communications designs provide interfaces and protocols suitable for realizing over-the-air transmission of data between electronic devices.

Wireless communication designs generally provide duplex data signal connectivity to exchange digital data with an electronic system, or mobile portable electronic device over-the-air in a wireless network environment. Transmitted signals are received at the device antenna, and the device converts the received digital data into an analog format equivalent voltage signal representation. Applying the voltage signal to a voice coil motor produces sound waves using a vibrating surface.

Manufacturers generally offer wireless communication designs integrating an audio signal reception device, such as a microphone, or a bone conduction transducer, with an in-ear monitoring component, such as a speaker.

Hands-free mobile wireless headset or in-ear device manufacturers continue to seek improvements in comfort and fit, decreased mass, decreased RF emissions, decreased power consumption, smaller form-factor, and reduced analog and digital noise artifacts, i.e. improving the signal-to-noise ratio (S/N) while improving overall performance and providing new features.

Current wearable wireless communication devices generally come in one of two types: a single, integrated wireless device, or a wireless device having a speaker component and a separate microphone component positioned on a boom or arm component. The integrated wireless device can be heavier, and is typically placed in the user's ear canal and rests in the ear canal or rests using some type of apparatus, such as a hook positionable over the user's ear. The separate microphone type of wireless device enables the wearer to adjust the earphone and microphone positions independently, allowing the wearer to 'fit' the wireless device according to his ear and jaw structures, but still hangs on or over the user's ear.

Manufacturers offering separate microphone and speaker components typically employ a cylindrical shaft and clutch arrangement for the user to rotate the components, typically about a single linear axis. Such devices can be heavy and can weigh on the ear, causing discomfort over an extended period of time. While component sizing has decreased over time, the weight of the speaker and other electronics being borne by a wearer's ear can become uncomfortable over extended periods.

Both integrally formed wearable devices and those with separate microphone and speakers can place pressure on the ear, including the inner ear canal and/or the outside of the ear when the headset employs a hook or other mounting device. Certain devices are available that place relatively heavy components, such as a speaker device, within housings intended to be located within the wearer's inner ear, which can be very uncomfortable. Each of these devices can slip or become dislodged from the wearer's ear, both of which are undesirable.

In light of the above, it would be beneficial to offer an enhanced wearable wireless communication device, or a device that maintains an individual's preferred orientation in a lightweight, comfortable design that can be worn for extended periods of time with minimal discomfort.

SUMMARY OF THE INVENTION

According to one aspect of the present design, a wearable wireless communication device is provided, including a behind-the-ear main electronics enclosure housing wireless communication electronics and a microphone provided therewith, a main electronics enclosure mount engaging the behind-the-ear main electronics enclosure, an ear mount fitting the main electronics enclosure mount, and a decorative mount including a speaker. The decorative mount attaches to the ear mount which is configured to fit over an ear of a wearer. Signals are transmitted from the main electronics enclosure to the main electronics enclosure mount, to the ear mount, and to the speaker in the decorative mount. Audio from the speaker is provided to the ear of the user. Pierced ear and non-pierced ear versions are provided, wherein the ear mount for the non-pierced ear version includes a clip that clips to the wearer's ear lobe. The pierced ear version includes a conductive post that passes through a piercing in the wearer's ear.

These and other advantages of the present invention will become apparent to those skilled in the art from the following detailed description of the invention and the accompanying drawings.

BRIEF DESCRIPTION OF THE DRAWINGS

For a more complete understanding of the present disclosure, reference is now made to the following figures, wherein like reference numbers refer to similar items throughout the figures:

FIG. 3 is a simplified rendering of a configurable ear mount element for use with a non-pierced ear;

FIG. 7 shows three perspective views of one embodiment of the ornamental decoration;

FIG. 10 illustrates a connecting post disengaged and separated from the main electronics enclosure mount and the main electronics enclosure mount separated from the main electronics enclosure;

FIG. 11 illustrates the connecting post engaged with the main electronics enclosure mount;

Figure 1A:
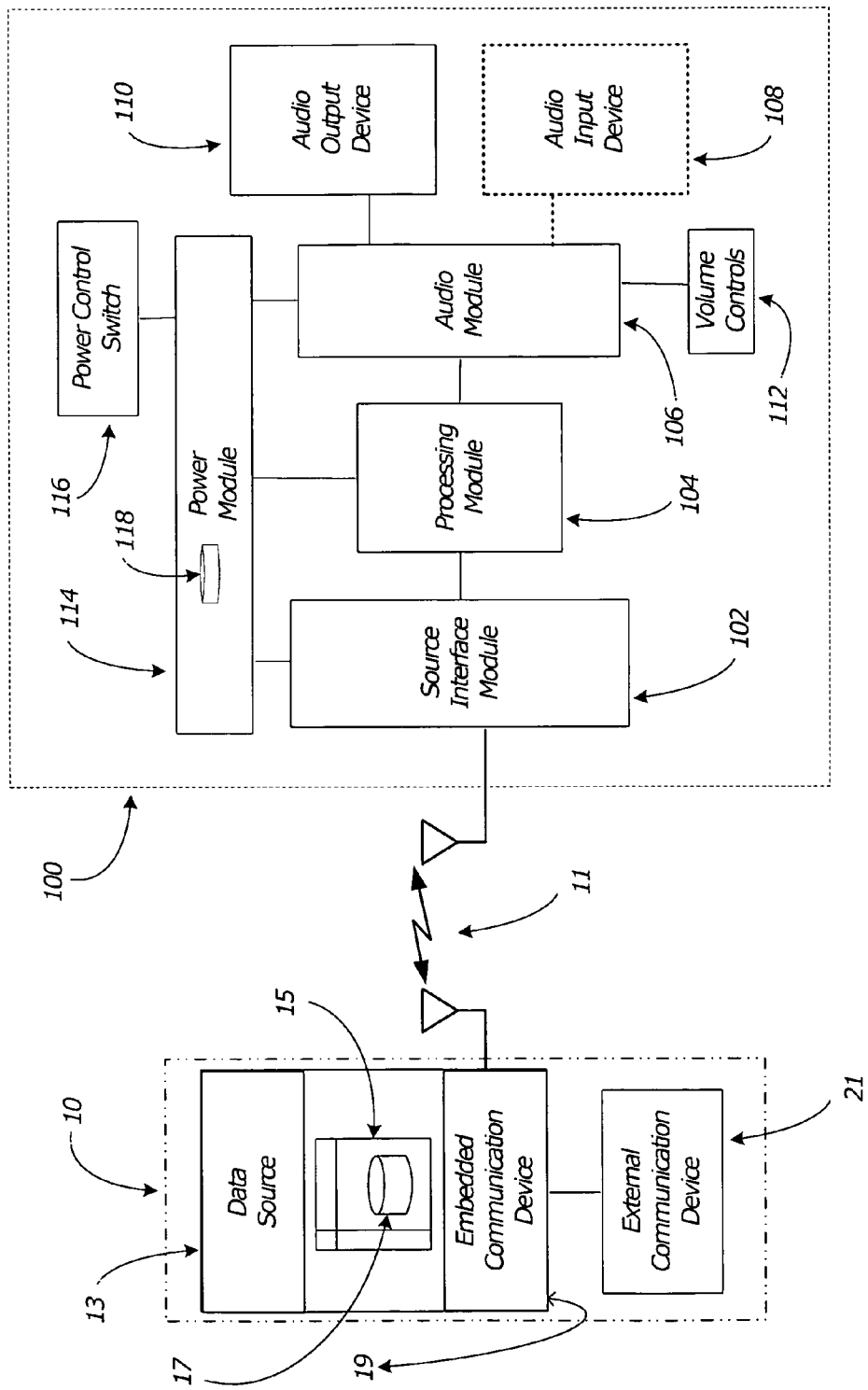
FIG. 1A illustrates a functional block diagram of the major elements and interfaces used with the present design.

The exemplification set out herein illustrates particular embodiments, and such exemplification is not intended to be construed as limiting in any manner.

DETAILED DESCRIPTION

The following description and the drawings illustrate specific embodiments sufficiently to enable those skilled in the art to practice the system and method described. Other embodiments may incorporate structural, logical, process and other changes. Examples merely typify possible variations. Individual elements and functions are generally optional unless explicitly required, and the sequence of operations may vary. Portions and features of some embodiments may be included in, or substituted for, those of others.

The present design is directed to a lightweight, wearable wireless communication device that can be worn comfortably for an extended period of time. The present design includes both a pierced ear configuration and a non-pierced ear configuration, where both configurations may include common parts. The present design provides a detachable main electronics enclosure intended to be worn behind the wearer's ear, which hides the electronics from view and can minimize stress on the ear. A microphone is provided, typically affixed to the main electronics enclosure, and when worn protrudes from under the wearer's ear and points toward the wearer's mouth. Signals pass from the detachable main electronics enclosure to a speaker in a decorative mount component worn over the ear, with the speaker transmitting audio through a tube to an ear bud and an ear. The present design is configured to allow removal, disassembling, and reassembling such that the wearer can position the device on either side of his head.

Certain components in the present design are positioned behind the ear of the wearer, while other components are positioned on the outside of the wearer's ear. As may be understood from the drawings provided herein, the device has components positioned on the outside of the wearer's ear, such as over her lobe. As used herein, the description of components as being "on top of" the ear, or "above" the ear, or "on the outside of" the ear are intended to be interpreted as on a front side of the ear, i.e. on an outer side of the ear as shown in the drawings presented.

The present design includes, in all configurations, main electronics in a main electronics enclosure, a main electronics enclosure mount that engages the main electronics such as by a pressure fitting, an ear mount that conveys electrical signals from the main electronics enclosure to a decorative mount having a speaker provided therein. The main decorative mount enables the wearer to place an optional ornamental decoration on the device. The speaker within the decorative mount transmits sound to the wearer through an ear tube to an ear bud positioned within the wearer's ear.

The present design provides for a pierced ear configuration and a non-pierced ear configuration. In the pierced ear configuration, the ear mount described above is a connecting post that connects the main electronics enclosure mount with the decorative mount and passes through the piercing of the pierced ear of the wearer. In the non-pierced ear configuration, a clip is provided that can clip to the ear of the wearer. As with the connecting post, the clip is connected to both the main electronics enclosure mount and the decorative mount and signals pass from the main electronics to the speaker in the decorative mount, thereby driving the speaker.

The ornamental decoration allows the wearer to select an outward cosmetic appearance, from a suite of interchangeable ornamental decorations, reflecting the individual's personal style and taste when worn. The ornamental decoration enables quick fastening, removal, and/or substitution of the device's visual ornamental exterior characteristics, including shape, color pattern, size, and/or surface ornamentation.

The wearable wireless communication device ear mount, main electronics enclosure mount, and main electronics enclosure are collectively configured to maintain a desired orientation using, for example, pressure or friction fittings, but other types of securing arrangements may be employed. Individuals may reposition the wearable wireless communication device by adjusting element position(s) within a three-dimensional spatial distribution, both prior to and after engaging the elements with one another and completing the assembly.

The connecting post in the pierced ear configuration may include a male plug for insertion into a female receptacle formed in the main electronics enclosure mount, where the connecting post also includes a non-circular end piece that prevents rotation within the female receptacle formed in the main electronics enclosure mount. In one arrangement, the non-circular end piece may have a multi-sided, or faceted, configuration, for example a geometrical shape such as a three dimensional hexagon, heptagon, or octagon shape, or any other non-circular shape such as a star, oval, etc.

A further attribute of the present design is the ability to pass or conduct electronic signals, such as an analog audio data signal, through the connecting post in the pierced ear configuration or the clip in the non-pierced ear configuration, thus passing signals from behind the wearer's ear to the outer facing area of the wearer's ear and subsequently into the ear of the wearer. Any number of conductive paths may interconnect the main electronics enclosure mount with the decorative mount, across the connecting post or clip, connecting the main electronics enclosure mount to the decorative mount via the connecting post or clip, providing duplex analog audio data signals to an output device such as a hearing tube driven by a speaker in the decorative mount.

The present design improves the outward facing visual appearance of the device by locating the electronics discretely behind the ear when worn. The device provides an attachment point on the decorative mount for placing and integrating an outward facing ornamental decoration that further conceals the device from view. The attaching point provides the individual flexibility to change the appearance of the device by choosing from a set of interchangeable cosmetic decorations.

The elements of the present design are described below, in some cases at an architectural level and in others at a logical level. The processing described below may be performed by a microprocessor based mobile computer platform. In addition, such processing and functionality can be implemented in the form of special purpose hardware or in the form of software or firmware being run by a general purpose or microprogrammed computer or computing device. Data handled in such processing or created as a result of such processing can be stored in any type of memory as is conventional in the art. By way of example, such data may be stored in a temporary memory, such as in the RAM of a given computer system or subsystem. In addition, or in the alternative, such data may be stored in longer term storage devices, such as FLASH memory, magnetic disks, optical disks, and so on. For purposes of the disclosure herein, a computer-readable media may comprise any form of non-transitory data storage mechanism, including existing memory technologies as well as hardware or circuit representations of such structures and of such data.

While the present design may be used in various environments and applications, it will be discussed herein with a particular emphasis on a hands-free environment where an individual affixes the wearable wireless communication device to her ear lobe for electronically (e.g. wirelessly) connecting with a fixed or mobile, wireless enabled electronic system, computer platform, smartphone, cellular phone, or other device. For example, one embodiment of the present design may provide for adjusting the spatial positioning for the device elements in a preferred orientation, custom tailored by and for the individual wearer. The fixed, assembled device may maintain the elements in a preferred position when worn and in use.

FIG. 1A is a functional block diagram of a hands-free wearable wireless communication device. The illustrated device exchanges data signals with a communication system including, for example, fixed location and mobile devices. The device disclosed herein typically communicates over-the-air using a wireless network. The device communicates wirelessly with portable electronic devices, such as cellular phones, laptops, notebooks, tablet computing devices, environmental controls, gaming consoles, and the like. The present design may provide two-way signaling to operate with these devices. In general, the present device and external devices may each transmit and receive duplexed signals.

FIG. 1A illustrates electronic system 10 in an arrangement for sending and receiving data signals, such as a service request over a communication link established with wearable wireless communication device 100. Wireless network 11 may enable a duplex communications transport facility that exchanges service requests over the link in order to provision and provide interoperable services. The duplex transport facility may enable electronic system 10 and wearable wireless communication device 100 to effectively operate together and exchange and use information through the established link. For example, wearable wireless communication device 100 may request electronic system 10 to provide a data file containing a music track or other stored data file resident and accessible by the electronic system. Electronic system 10 may process the request, retrieve the requested data file, and transmit the requested file to the wearable wireless communication device. The wearable wireless communication device receives the data file, such as by streaming an audio signal, and converts the received data to an analog representation and may provide the analog signal to the user via an internal speaker in the device.

The wearable wireless communication design may include a microphone mechanism for capturing an analog audio signal, such as an individual speaking an instruction or making a telephone call, and may deliver the audio signal to the main electronics or wireless electronics of the wearable wireless communication device 100. Wearable wireless communication device 100 may code, or digitize, the analog audio signal captured by the microphone mechanism, and may communicate the digitized representation over the air to electronic system 10.

Data source 13 generally represents a component executing operational processes able to access the wireless network. Data source 13 may provide internal storage 15, such as in database 17. Internal storage 15 may save information, such as formatting or audio content in analog or digital form, using database 17. Electronic system 10 may access wireless network 11 using communications device 19. Alternately, communications device 21 may be physically connected, such as by wire, to wearable wireless communication device 100.

Wearable wireless communication device 100 may include source interface module 102, configured to send and receive service requests for connecting with electronic system 10, and may provide a duplex communication signal over wireless network 11 to exchange with communication device 19 or external communications device 21. Audio content may include, but is not limited to, audio music, pre-recorded messages, voice signals, alarm signal tone(s), and device control commands available for delivery based on an individual's request, as well as other data.

Source interface module 102 may process duplex data signals using an executable procedure, subroutine, routine, or function, to send and receive duplex digitized data signals over wireless network 11. The executable procedure may provide network connectivity including for, but not limited to, processing communication signals conforming to IEEE 802.15.1 specification for wireless personal area networks (WPAN), generally known as Bluetooth, the IEEE 802.11 wireless local area network (WLAN) modulation techniques "a, b, g, and n", and optical techniques using line-of-sight protocol specifications from the infrared data associations (IrDA). Data source 13 may enable exchange of data signals over-the-air, through wireless network 11, or through a fixed cable (not shown). The procedure may include the processing for IEEE 802.15.1 networks signals, namely for Advanced Audio Distribution Profile A2DP, for implementing audio streaming functionality. For example, a mobile portable music player, such as an Apple iPod, may be configured to stream or provide data to wearable wireless communication device 100. The wearable wireless communication device 100 may render the data stream as an analog audio data signal for monaural sound reproduction. In the situation where an individual wears two such devices, one for each ear, stereo sound may be provided.

Source interface module procedures may provide for the conversion of received RF communication signals transmitted from electronic system 10. Executing the procedure, or procedures, may provide a digital data signal conversion process, generating data in a format readable by processing module 104. Source interface module 102 may transfer formatted data to processing module 104. The processing module 104 may provide data compression and data conversion methods and techniques to manipulate audio spectrum signals and digital domain data. Processing module 104 may include, but is not limited to, performing signal processing functions such as analog-to-digital conversion (ADC), digital-to-analog conversion (DAC), and data compression.

The present design may include, but is not limited to, audio data compression functionality such as, for example, ISO/ICE MP2, MP3 and ALS coder/decoder, Dolby Labs AC-3, or Sony Corporation's ATRAC.

The present wearable wireless communication device 100 may also include audio module 106 to send and receive data to and from processing module 104. Audio module 106 may detect the presence of and receive audio signals from audio input device 108. Audio input device 108 may be, for example, a microphone. Audio module 106 drives audio output device 110, such as a voice coil motor, or speaker, based on received data signals. The wearable wireless communication device may provide volume controls 112, including, but not limited to, adjusting the volume level, such as 'up', 'down', and 'mute' functions. Volume controls 112 may connect with audio module 106, and may enable the user to adjust and set the audio output signal level rendered at the wearable wireless communication device speaker. Sensitivity adjustment functionality may be provided, as well as noise reduction functionality, such as capability available from Dolby Laboratories or dbx, Inc.

Power module 114 may supply energy to the wearable wireless communication device modules as shown in FIG. 1A. The power module may be switched on and off using power control switch 116. Power module 114 may include a power source, such as small form factor battery 118, for example a lithium-ion battery having sufficient storage for operating the wearable wireless communication device.

Figure 1B:
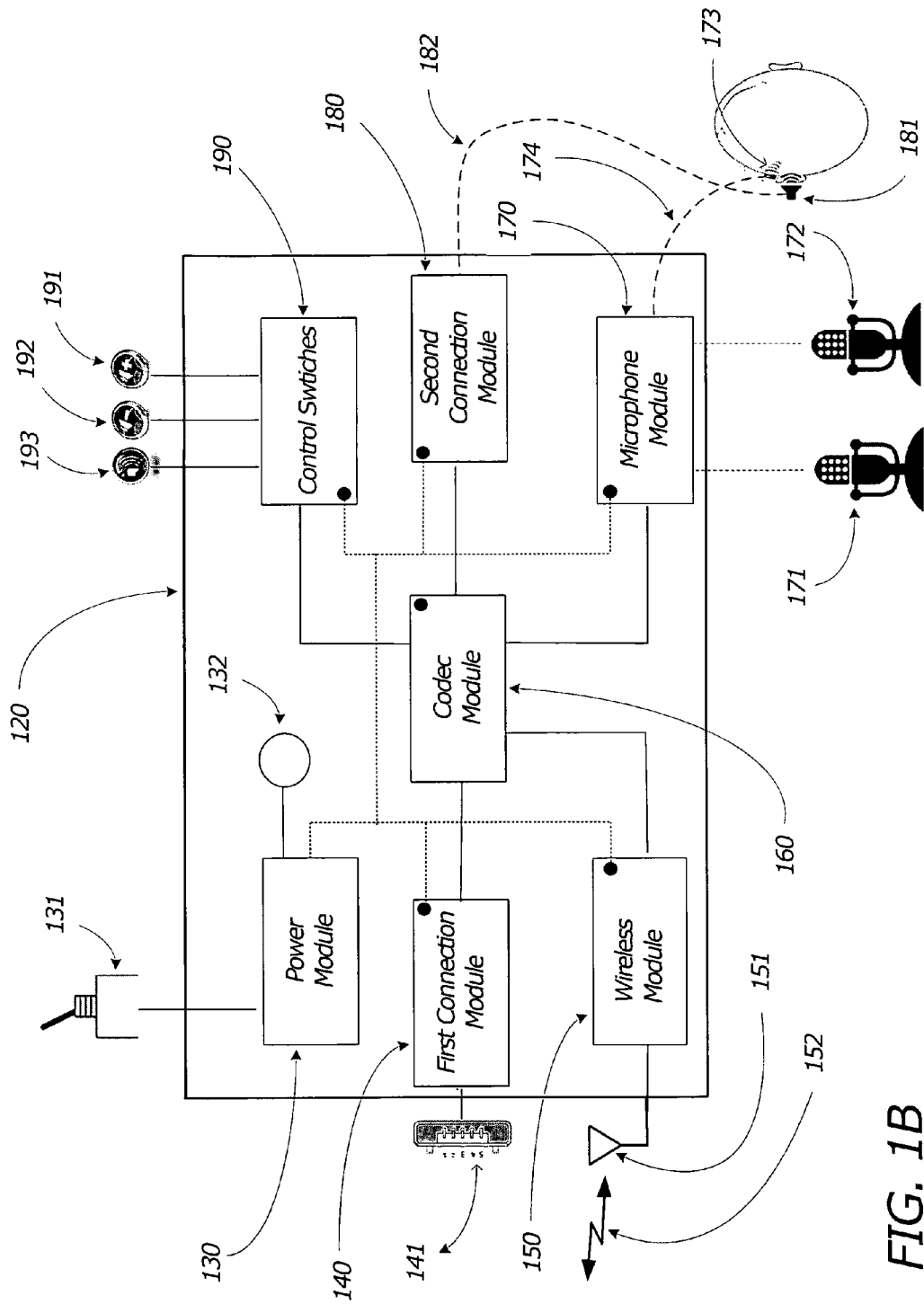
FIG. 1B is a simple physical component block diagram illustrating elements and interfaces for a wearable wireless communication device suitable for use in an over-the-air communications network.

FIG. 1B is a block diagram illustrating main electronics components of wearable wireless communication device 100 shown in FIG. 1A. Main electronics 120, housed within the enclosure, may provide elements including, but not limited to, power module 130, first connection module 140, wireless communication module 150, codec module 160, microphone module 170, second connection module 180, and control switches 190. First connection module 140 may provide external power distribution via a connector 141, where connector 141 may be any appropriate connector including but not limited to a universal serial bus (USB) connector.

In this arrangement, switch 131 may connect rechargeable battery 132 with main electronics 120 and may switch power module 130 from an off position to an on position to operate the main electronics 120. The device may provide micro USB connectivity via connector 141, or other suitable network communications connection arrangement. Antenna 151 may provide a duplex radio frequency (RF) network access point configured to send and receive data over communications network 152. Wireless communication may be via any wireless communications protocol known in the art, including but not limited to Bluetooth transmission protocol. Wireless communication module 150 illustrated in FIG. 1B may be a Bluetooth module, i.e. a module configured to transmit and receive signals conforming to the Bluetooth protocol.

Codec (coder/decoder) module 160 may provide digital signal processing of data received from connection module 140, wireless communication module 150, or microphone module 170, or control switch module 190. Processing may include, but is not limited to, device controller data and converting digitized audio data into an analog data equivalent for rendering analog audio at the wearable wireless communication device. Second connection module 180 may arrange output received from codec module 160 for processing and provide an output signal to speaker 181 over signal audio output path 182. The microphone module 170 may enable connections over signal audio input path 174 to a plurality of microphones at points 171 and 172, optionally in combination with a bone transducer pick-up arrangement, shown generally at point 173. Use of a bone conduction microphone may occur at different regions on the wearer, including below the earlobe at the jaw line or at some other appropriate position.

Control switches 190 may include volume up 191, volume down 192, mute 193, and similar control features for adjusting the sound level produced at speaker 181. Other control switches or input mechanisms (e.g. touchpad interfaces, trackballs, sliding mechanisms, etc.) may be provided.

Non-Pierced Ear Wearable Wireless Communication Device

Figure 2:
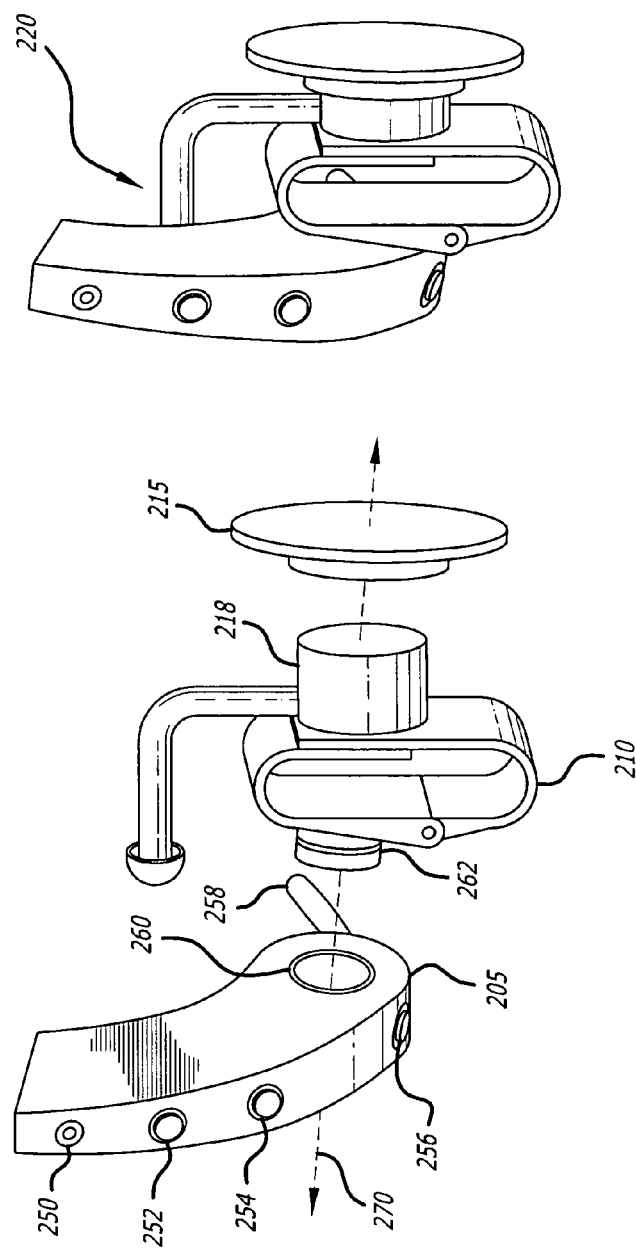
FIG. 2 shows an exploded view and an assembled view of the present design in an arrangement for use by an individual without a pierced ear.

FIG. 2 is a simplified rendering of the major elements of an embodiment of the wearable wireless communication device for use by an individual without pierced ears. The left side of FIG. 2 includes a separate view with components removed along axis 270, while the right side of FIG. 2 shows an assembled view. In this arrangement, ear clamp 210 is a hinged mechanism configured to open and close so that the user may place the wearable wireless communication device on a non-pierced ear.

Main electronics enclosure 205 houses the main electronics, power source, and controls. Main electronics enclosure 205 may be fabricated using a lightweight material, such as plastic or aluminum, or other materials suitable for constructing a lightweight design. Ear clamp 210 may attach to and electrically connect with main electronics enclosure 205 via main electronics enclosure mount 262. Attaching may involve assembling ear mount 210 with main electronics enclosure 205, such as using a press or snap fixture, or using a friction type mount. Ear clamp 210 is attached and electrically connected to decorative mount 218, which may include a speaker inside and a hearing tube and ear bud 220 affixed thereto as illustrated in FIG. 2, in a single package or preassembled unit.

Ornamental decoration 215 can provide the wearer a variety of interchangeable decorative exteriors. An individual can quickly place, change, or remove the ornamental decoration 215. The decorative exteriors may be various visual ornamental characteristics, involving shape, color patterns, or surface ornamentation, and combinations thereof. The interchangeable ornamental decoration may significantly or completely cover wearable wireless communication device elements, hiding part or all of the remainder of the wearable wireless communication device when worn, and may fit on decorative mount 218 as shown.

Main electronics enclosure 205 may include power switch 250, volume up control 252, volume down control 254, and call/volume mute switch 256 located on the main electronics enclosure's rearward facing side as shown in FIG. 2. The microphone support arm 258, or boom, may be positioned on the forward facing side in order for the microphone mechanism to be positioned along the wearer's jaw bone directed towards the wearer's mouth. The support arm may include traditional microphone transducer elements, such as magnetic or ceramic elements, and bone transducer pick-up or sensing elements.

Female connector 260 may provide electrical connectivity and may use a compression fixture to connect ear clip 210 with main electronics enclosure 205 via main electronics enclosure mount 262. Main electronics enclosure mount 262 may be fixedly mounted to ear clip 210, and main electronics enclosure mount 262 may be inserted into female connector 260 from the left or right side of main electronics enclosure 205. Female connector 260 may be an open hole allowing a pressure fit of main electronics enclosure mount 262, or may include a ring that either rotates or does not rotate within main electronics enclosure 205. The mated female connector 260 and main electronics enclosure 205 may include a plurality of electric signal paths formed between the two components. Mating in this manner allows for delivery of data signals from the main electronics in main electronics enclosure 205 to the speaker.

A multi-pinned connector (not shown), such as a micro USB, in main electronics enclosure 205 may enable charging the battery within main electronics enclosure 205. Such a multi-pinned connector may be located on the top of main electronics enclosure 205 or in any other available position on the main electronics enclosure 205. The multi-pinned connector may also facilitate communication of data with external peripheral devices, for example a smart phone or portable media player.

The wearable wireless communication device provides monaural sound reproduction in both the non-pierced ear configuration and the pierced ear configuration discussed below. An individual may operate two devices for stereo sound reproduction. When using in the left ear, the ear mount may approach the enclosure from the opposite side. The mounting arrangement may enable rotating or flipping enclosure 205 three-hundred and sixty degrees (360°) about a horizontal axis at point 270. Rotating the enclosure 180° in either direction about the vertical axis relative to the ear mount before assembling the device for operation provides an ability to use the device with either ear.

FIG. 3 is an alternate view of the non-pierced ear configuration 300 without the main electronics enclosure shown. Hinge 310 provides a pivot point for rotating first clamping surface A in an outward direction, moving first clamping surface A away from second clamping surface B. Hinge 310 may include an integral locking mechanism, such as a spring loaded lever mechanism, sufficient to hold and maintain the wearable wireless communication device in the closed position shown in FIG. 3. The wearer may open the mechanism and position the mechanism about his ear lobe. Upon releasing the clip mechanism, the mechanism may close, applying clamping pressure about the lobe. A relatively wide ear lobe engagement area may disperse clamping pressure evenly across the ear lobe while reducing the pressure applied. A light textured compound may be applied across the two clamping surfaces to impress a frictional force about the ear lobe at the ear clamp contact surfaces. The ear clip-on and hinge mechanism may be constructed using aluminum or other lightweight and/or hypoallergenic materials.

Both the pierced ear and non-pierced ear configurations may employ interchangeable ear bud 320 and hearing tube 322, and a press fit may be required to install ear bud 320 onto hearing tube 322. A press fit arrangement may facilitate changing the ear bud 320 and/or hearing tube 322 when necessary. Ear bud 320 may be constructed using surgical grade silicon and produced in a variety of sizes, and may include multiple openings (ported) or a single exit opening (non-ported). The ported version may include a number of small openings. In contrast, the non-ported ear bud 320 may provide a single ear bud opening, or exit point, for audio sound reproduction. In some instances, the non-ported arrangement may be preferred because it may attenuate undesirable sound waves originating in the wearer's general ambient environment.

Hearing tube 322 may deliver audio from a speaker driver housed in, for example, decorative mount 335 to the ear bud 320 and to the wearer's inner ear canal when the ear bud is inserted in the wearer's ear. Hearing tube 322 may include a threaded end for affixing to decorative mount 335, providing easy installation, replacement, and accommodation of different length hearing tubes. Threading the hearing tube 322 into decorative mount 335 allows a vertical rotational movement between hearing tube 322 and decorative mount 335. Other connections between hearing tube 322 and decorative mount 335 may be provided, such as a cylindrical hollow component being formed on or provided with decorative mount 335 that receives hearing tube 322 and mates using a press fit.

The wearable wireless communication device includes main electronics enclosure mount 325 that fits into female connector 260 of FIG. 2. Main electronics enclosure mount 325 may employ a press fit connection, such as a pliable plastic compression or snap-on fitting, for mating with the enclosure, or other fitting known in the art. Main electronics enclosure mount 325 may include a plurality of conductive strips 330 peripherally encircling main electronics enclosure 325. FIG. 3 illustrates two conductive strips for completing an electrical circuit. Conductive strips 330 may contact the conducting surfaces, e.g. conductive points or pins, positioned inside the female connector of main electronics enclosure 205 of FIG. 2. Conductive strips and conductive points or pins may be symmetrically located equidistant from the center of the connector in one arrangement.

Decorative mount 335 may provide a male-style compression fit snap connection accepting ornamental cosmetic decoration 700 of FIG. 7. A speaker may be located inside decorative mount 335 and drive audio through hearing tube 322. The decorative mount 335 and the ornamental cosmetic decoration 700 may each be fabricated using a lightweight material, such as pliable plastic or other lightweight and/or hypoallergenic materials.

Figure 5:
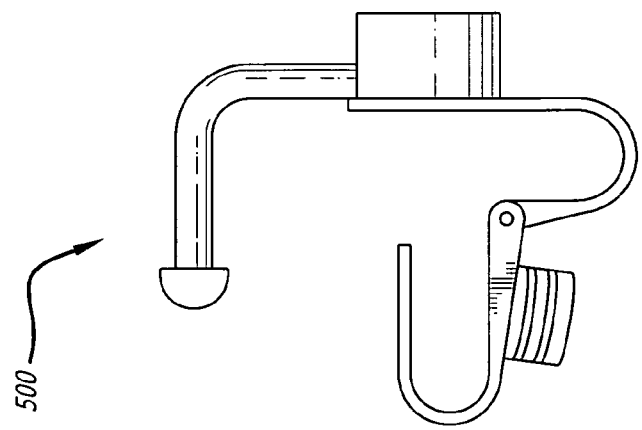
FIG. 5 illustrates the present design's non-pierced ear clip hinge mechanism in an open position.
Figure 4:
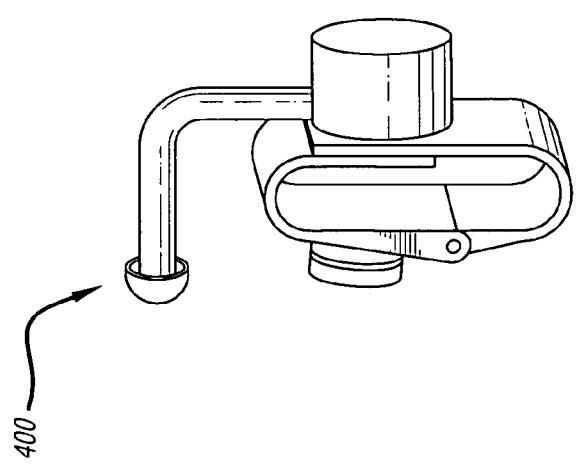
FIG. 4 illustrates the present design's non-pierced ear clip hinge mechanism in a closed position.

FIG. 4 illustrates a clip-on ear mount element in a closed position. Wearable wireless communication device 400 includes a hinged clip to clamp and hold the device on the ear lobe. FIG. 5 illustrates wearable wireless communication device 500 with a hinged clip in an open position prior to placing the device onto the wearer's ear lobe.

Figure 6:
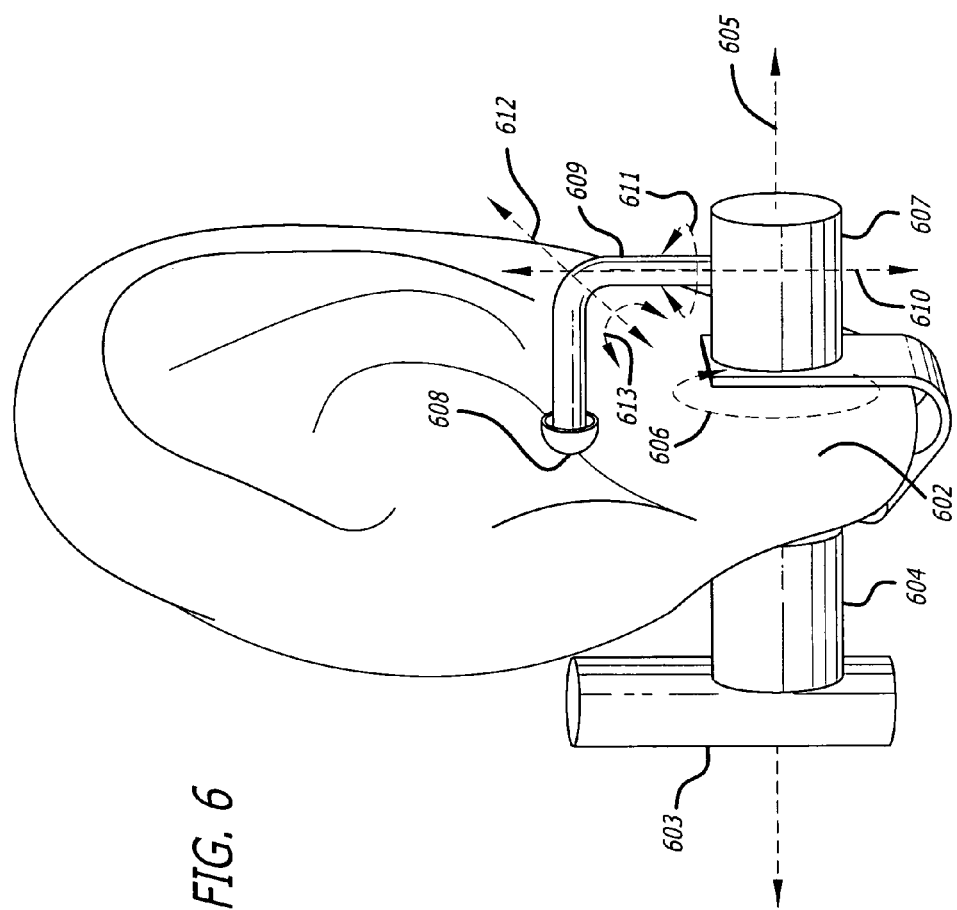
FIG. 6 is a general representation of elements of the non-pierced ear wearable wireless communication device.

FIG. 6 is a simplified alternate embodiment of the non-pierced ear design that shows certain rotation characteristics. This embodiment uses hinged ear clamp 601 to secure the wearable wireless communication device to ear lobe 602 and offers rotatable components. Hinged ear clamp 601 may rotate about ear lobe 602 as shown by circular motion 606. Again, components such as main electronics enclosure 603, main electronics enclosure mount 604, ear lobe 602, and decorative mount 607 are represented, similar to the design illustrated in, for example, FIG. 2. The main electronics enclosure 603 and main electronics enclosure mount 604 may individually or collectively rotate about first axis 605. The arrangement includes ear bud 608 and hearing tube 609. Hearing tube 609 rotates about second axis 610 in circular motion 611 and third axis 612 in circular motion 613. Ear clamp 601 attaches to ear lobe 602.

The wearer may rotate decorative mount 607 or the ear clamp 601 about the first axis 605. Ear clamp 601 may be fixedly mounted to main electronics enclosure mount 604 in any manner known in the art, and may be, for example, affixed to a post (not shown) joined to ear clamp 601. Providing identically shaped components may provide economies when fabricating the pierced ear and non-pierced ear configurations. The ear clamp 601 electrically connects main electronics enclosure mount 604 to decorative mount 607. In the two conductor arrangement, two conductive paths (not shown) result, typically using a pair of wires internally routed through ear clamp 601.

FIG. 7 presents three perspective views depicting ornamental cosmetic decoration 700, namely outside facing front view 701, side view 702, and inside facing or rear view 703. The ornamental cosmetic decoration 700 is mountable on either the non-pierced ear or pierced ear configuration described below, namely on the decorative mount, such as decorative mount 218 in FIG. 2. Ornamental cosmetic decoration 700 may include a female receptacle compression fit snap connector 704 enabling the positioning of ornamental cosmetic decoration 700 on the decorative mount using socket 705, or a similar device.

Pierced Ear Wearable Wireless Communication Device

Figure 8:
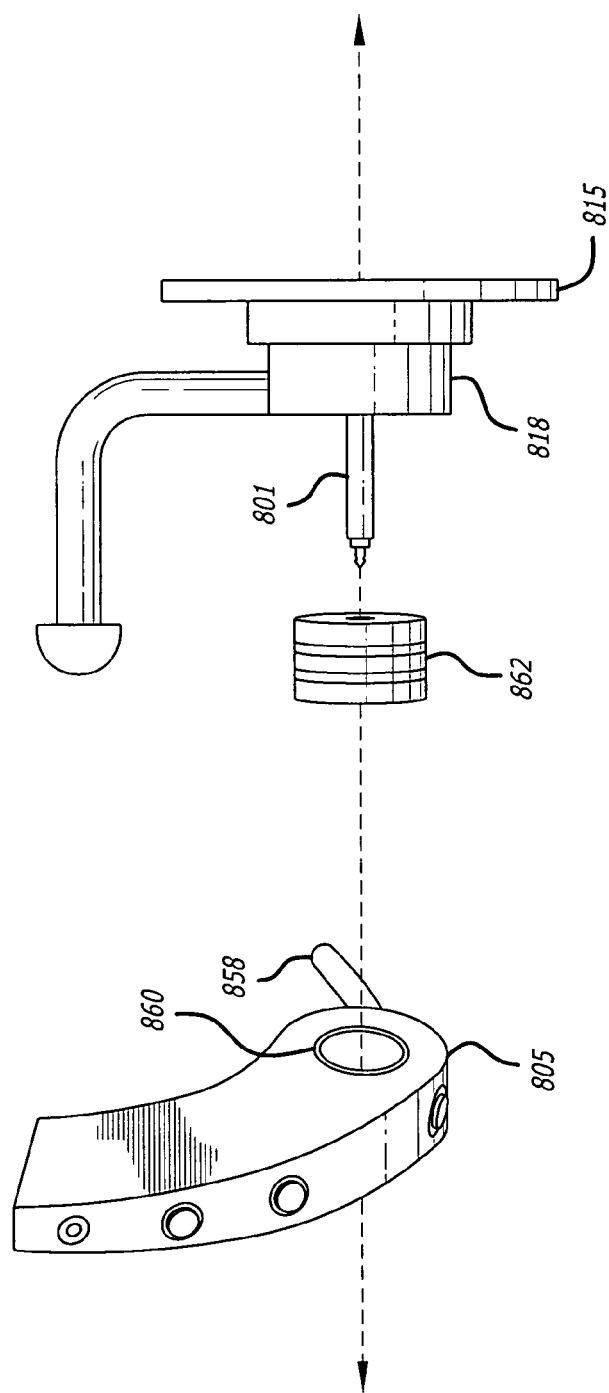
FIG. 8 illustrates the elements of the pierced ear version of the present design.

FIG. 8 illustrates the pierced ear configuration of the present design. In this arrangement, the ear clamp is not required. In the pierced ear embodiments, components from FIG. 2 may be the same as or similar to components in FIG. 8. For example, FIG. 8 shows main electronics enclosure 805 including female connector 860 and microphone 858, and the entire main electronics enclosure 805 of FIG. 8 may be identical to the main electronics enclosure 205 of FIG. 2. FIG. 8 shows assembling and connecting main electronics enclosure 805 with main electronics enclosure mount 862, which resembles main electronics enclosure mount 262 in FIG. 2 but fits with connecting post 801 which passes through the piercing in the ear of the wearer. The other components, including decorative mount 818 and ornamental decoration 815, as well as the ear tube and ear bud shown, may be identical or similar to the components shown in FIG. 2.

Figure 9:
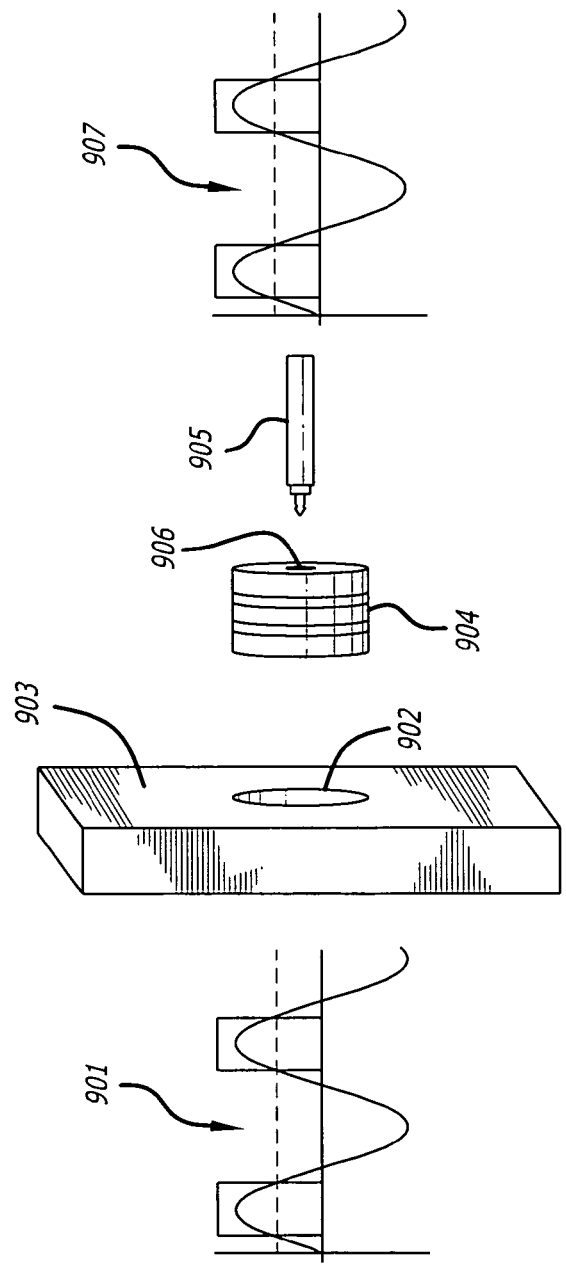
FIG. 9 illustrates signal transmission through the main electronics, main electronics enclosure mount, and the connecting post in accordance with the pierced ear configuration of the present design.

FIG. 9 illustrates digitized data transferred from the source input module to the signal processing module in the main electronics enclosure 903. A power signal may be superimposed on top of the digital signal data and provide electricity to the relocated modules. FIG. 9 illustrates an analog audio sine wave superimposed on top of a direct current power signal in combination with a digital data stream. The resultant digital input signal 901 may originate from a wireless over-the-air transmission and be received and subsequently transmitted by the main electronics (not shown in this view).

FIG. 9 also shows female connector 902, located within a section of the main electronics enclosure 903, with main electronics enclosure mount 904 insertable into female connector 902. The pierced ear configuration further includes connecting post 905 that fits within opening 906 and electrically connects to main electronics enclosure mount 904. The duplex signaling arrangement illustrated in FIG. 9 reproduces the digital input signal 901 by transmitting the digital input signal through the male tip on connecting post 905 and produces the waveform 907 shown on the right side of FIG. 9. In this manner, signals or data may be transmitted through connecting post 905 through a piercing in the wearer's ear, from main electronics housed in an enclosure behind the wearer's ear to electronics and audio components located in front of the user's ear, and then into the user's ear.

FIGS. 10 and 11 illustrate two views of the interconnections of elements in the pierced ear configuration, where FIG. 10 is an "extracted" view and FIG. 11 is an "inserted" view. FIG. 10 shows decorative mount 1024, connecting post 1022, and post segment male plug 1023, extracted from female receptacle 1020, disengaged and separated from main electronics enclosure mount 1010. FIG. 10 illustrates an eight-sided conductive male plug and similarly shaped female receptacle ready for assembly. Referring to the detailed expanded view of FIG. 10, the main electronics enclosure mount 1010 may include a plurality of electrical connections 1012 and forms the male half of a compression fit for attachment to main electronics enclosure 1013. Main electronics enclosure 1013 in this arrangement includes female receptacle 1014. Mating the male and female compression fit halves completes a series electrical circuit between conductive pins or points 1016 in female receptacle 1014 and conductive bands 1012 on main electronics enclosure mount 1010, enabling the conductive pins or points 1016 to remain in constant contact with the conductive bands 1012 in any orientation, i.e. through 360 degrees of rotation.

Conductive pins or points 1016 may be, for example, pins or rotatable spheres rotatable within openings formed on the inner surface of female receptacle 1014. Such spheres may provide for a high quality contact between the conductive strips and the female receptacle 1014, providing superior signals to and from the main electronics housed in the main electronics enclosure. In one embodiment, conductive bands 1012 may be formed of slight grooves such that the conductive points 1016 formed as spheres lock the main electronics enclosure mount 1010 axially within the main electronics enclosure 1013. Such an arrangement may include components inhibiting rotation of the main electronics enclosure mount 1010 within female receptacle 1014. Conductive bands 1012 typically encircle main electronics enclosure mount 1010, completing a circuit connection when in contact with conductive pins or points 1016.

FIG. 11 illustrates the male plug of the connecting post 1022 inserted into receptacle 1020 within main electronics enclosure mount 1010. The male plug and female receptacle provide a physical interlocking mechanism holding decorative mount 1024 and main electronics enclosure mount 1010 in a fixed position in this pierced ear configuration. The male plug and the female receptacle may employ a non-circular plug and socket in an arrangement mating the two elements and forming an electric serial circuit. As noted, various non-circular shapes may be employed near the end of connecting post 1022, where in FIG. 10 an octagonal shape is presented. In the assembled configuration of FIG. 11, the wearable wireless communication device may resist torque applied across the assemblage of elements sufficient to prevent torsion movements and changes in the spatial arrangement of the assembled elements.

The structural distribution of conductive bands 1012 provides two conductive paths that convey an audio signal from the main electronics to a speaker (not shown) housed within decorative mount 1024. The signals from the main electronics pass from female receptacle 1014 to main electronics enclosure mount 1010 to male plug of connecting post 1022, through connecting post 1022 to the speaker 1026 housed in decorative mount 1024. In this arrangement, as described below in more detail, the portion of the conductive post 1022 away from the tip of the conductive post 1022 is non-conductive, and the tip and an inner conductive element conduct the necessary signals to the speaker housed in decorative mount 1024.

Figure 12:
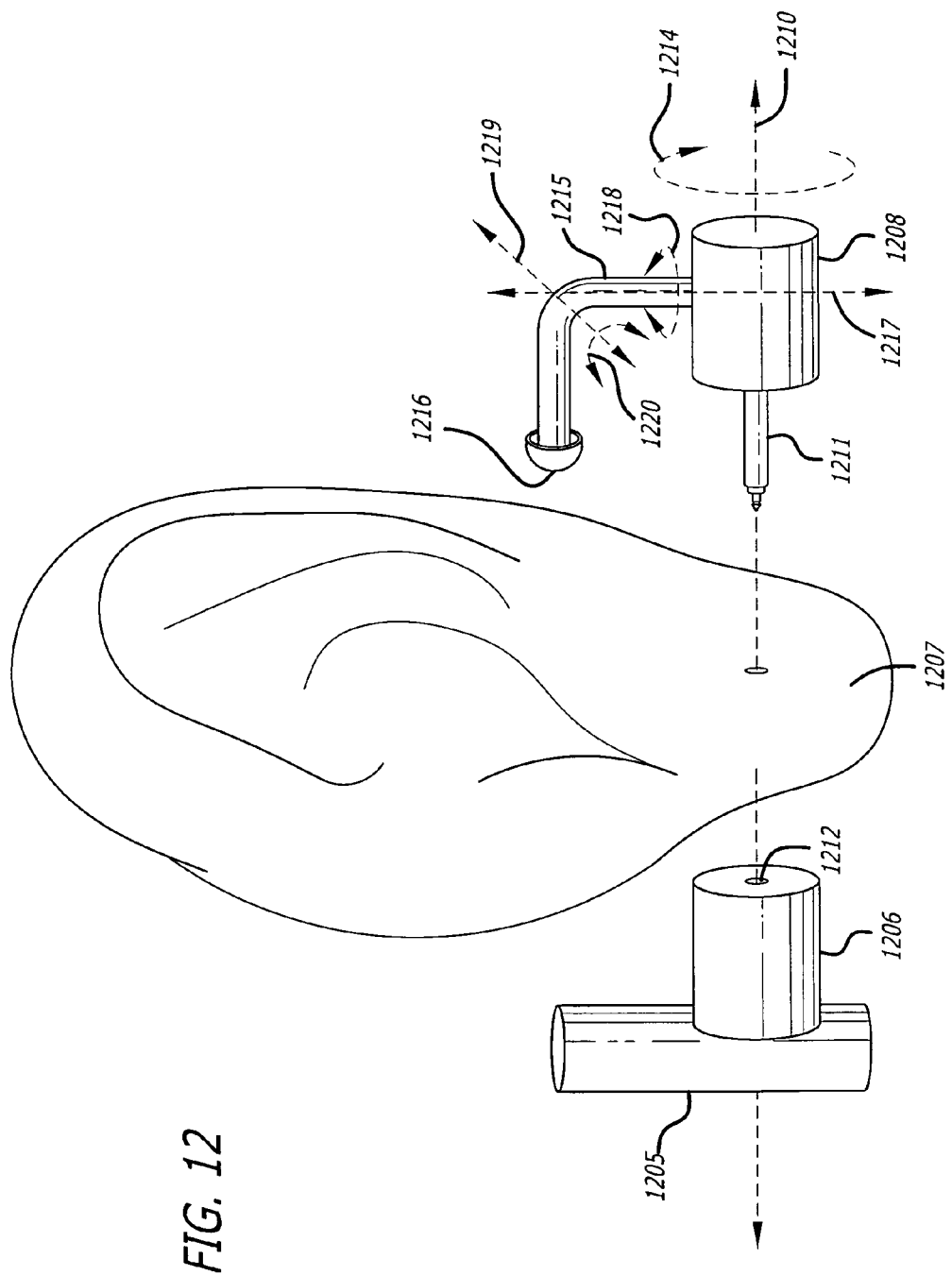
FIG. 12 is a general representation of elements of the pierced ear wearable wireless communication device.

FIG. 12 is an alternate representation of the pierced ear lobe configuration, showing an embodiment with certain rotational features. This alternate representation includes main electronics enclosure 1205, main electronics enclosure mount 1206, pierced ear lobe 1207, connecting post 1211, and decorative mount 1208. This alternative design includes a first rotational degree of freedom for main electronics enclosure mount 1206, or main electronics enclosure 1205, about first axis 1210 to adjust the main electronics enclosure's relative position with the main electronics enclosure mount 1206. As with the other pierced ear embodiments, main electronics enclosure mount 1206 may physically attach to and electrically connect with decorative mount 1208. The wearer passes connecting post 1211, affixed to the decorative mount 1208, through pierced ear lobe 1207, and inserts the connecting post's integrated end, or tip, into opening 1212 in main electronics enclosure mount 1206.

In this embodiment, main electronics enclosure mount 1206, or decorative mount 1208, or the combination, may rotate about first axis 1210. A continuous duplex communication circuit path may be provided from main electronics enclosure mount 1206, through the wearer's ear lobe 1207 to decorative mount 1208 using the connecting post arrangement. Decorative mount 1208 typically includes a speaker and/or speaker driver (not shown), and the continuous duplex communication circuit provides signal to the speaker or speaker driver. The connecting post 1211 and decorative mount 1208 may rotate about first axis 1210 in a circular motion 1214.

FIG. 12 illustrates ear bud 1216 affixed to hearing tube 1215, using a press fit or threaded connection. A similar attaching mechanism may be provided to affix the hearing tube to the decorative mount 1208. Hearing tube 1215 may have male threading and be assembled with a matching female threading provided on decorative mount 1208 such that hearing tube 1215 rotates about a second axis 1217, shown as circular motion 1218. Alternately, no threading may be provided, and a press fit of the hearing tube 1215 onto a tube protruding from decorative mount 1208 may be provided. Ear bud 1216 may rotate about decorative mount 1208, ear lobe 1207, main electronics enclosure mount 1206, and main electronics enclosure 1205. The hearing tube 1215 and ear bud 1216 may rotate about a third axis 1219, shown as circular motion 1220.

Figure 13:
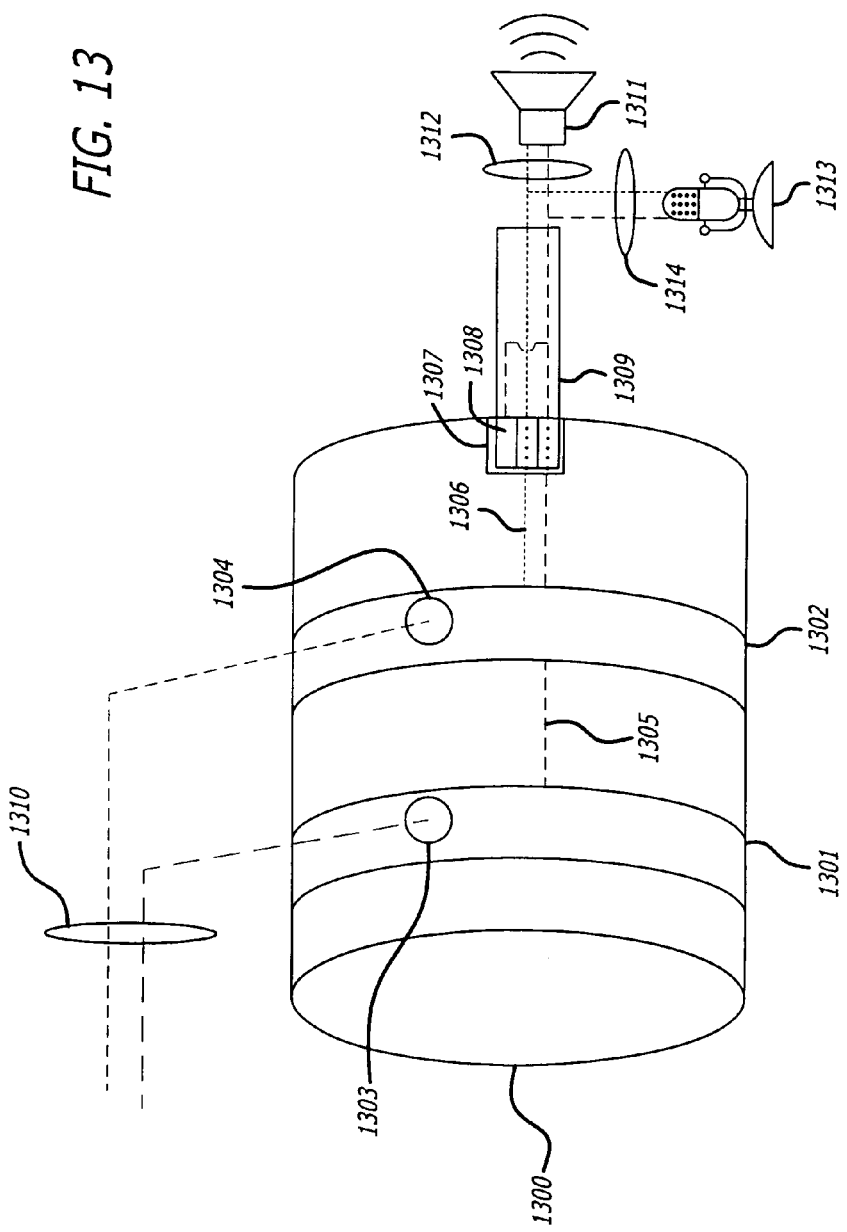
FIG. 13 illustrates the physical and associated electrical components of an embodiment of the main electronics enclosure mount for the pierced ear configuration.

FIG. 13 shows the various electrical connections surrounding main electronics enclosure mount 1300 in the pierced ear configuration. In this embodiment, main electronics enclosure mount 1300 includes two conductive bands 1301 and 1302 that contact the two conductive points 1303 and 1304, respectively. Main electronics enclosure mount 1300 includes two internal conduction paths 1305 and 1306 that pass data signals from the main electronics 1310. Each conductive path may include, but is not limited to, internal wiring, internal conductive bands, and the like, transferring signal data to female receptacle 1307. Female receptacle 1307 may enable inserting and retention of end post 1308, shown in this view as a multi-sided element at the end of connecting post 1309, forming a data signal path between main electronics enclosure mount 1300 and connecting post 1309.

Conductive surfaces of post segment 1308 contact conductive surfaces of female receptacle 1307 when assembled and ready for use. Connecting post 1309 passes signals received at post segment 1308 from female connector 1307 to speaker 1311. Signals 1312 originate from main electronics 1310 and pass to speaker 1311. Voice signals 1314, captured by one or more microphones, such as microphone 1313, are converted into analog data, and may be provided to the main electronics 1310 through connecting post 1309 and conductive bands 1301 and 1302. Microphones such as microphone 1313 may be positioned within or be part of the decorative mount.

The number of signal pairs is not limited, and additional conducting paths may be supported. Additional conductive paths may include a single conductive path 'm' for three-wire configuration or in conductive path pairs 'n' for additional signal circuitry, and in any m+n combinations thereof. For example, a second signal pair may provide power distribution between the elements, delivering power from the main electronics through the conductive paths and operating a lamp affixed to the ornamental decoration, illuminating the decoration.

Figure 14:
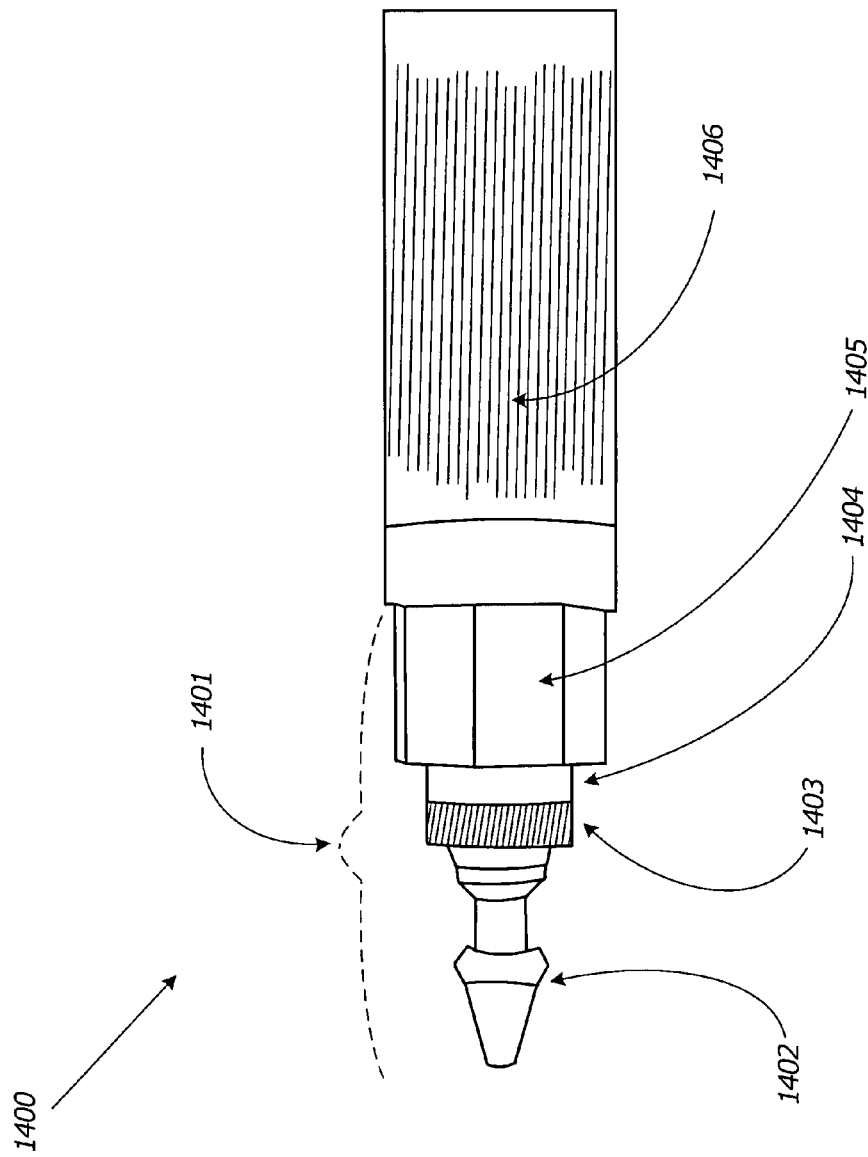
FIG. 14 is a view of one embodiment of the connecting post.

FIG. 14 is a side view rendering for the connecting post 1400, similar to connecting post 1022 in FIG. 10. This FIG. 14 embodiment shows connecting segment 1401, where connecting segment 1401 includes two conductive paths. Tip 1402 forms the tip of a conductive rod passing through the center of connecting segment 1401. First non-conductive insulator 1403 surrounds this center conductive rod. Second conductive path or ring 1404 is a hollowed core conductive cylinder surrounding the conductive rod passing through the center of connecting segment 1401, and is concentrically aligned with the first non-conductive insulator 1403. Such an arrangement isolates the first conductive path, through tip 1402, from second conductive path 1404. Tip 1402 and the remaining components of connecting segment 1401; including the multi-faceted element 1405 shown in this view, provide a point of retention when held in place by the female opening or socket (not shown). Second non-conductive insulator 1406 may surround second conductive path 1404 to isolate the second conductive path 1404 from the exterior of connecting post 1405.

The device may include additional conducting paths by alternating additional conductive elements, such as additional conductive rings and non-conductive elements, such as non-conductive circular elements positioned between conductive rings. For example, the number of rings exposed at the post segment's end tip may be added as necessary to provide a desired number of connective paths.

Figure 15:
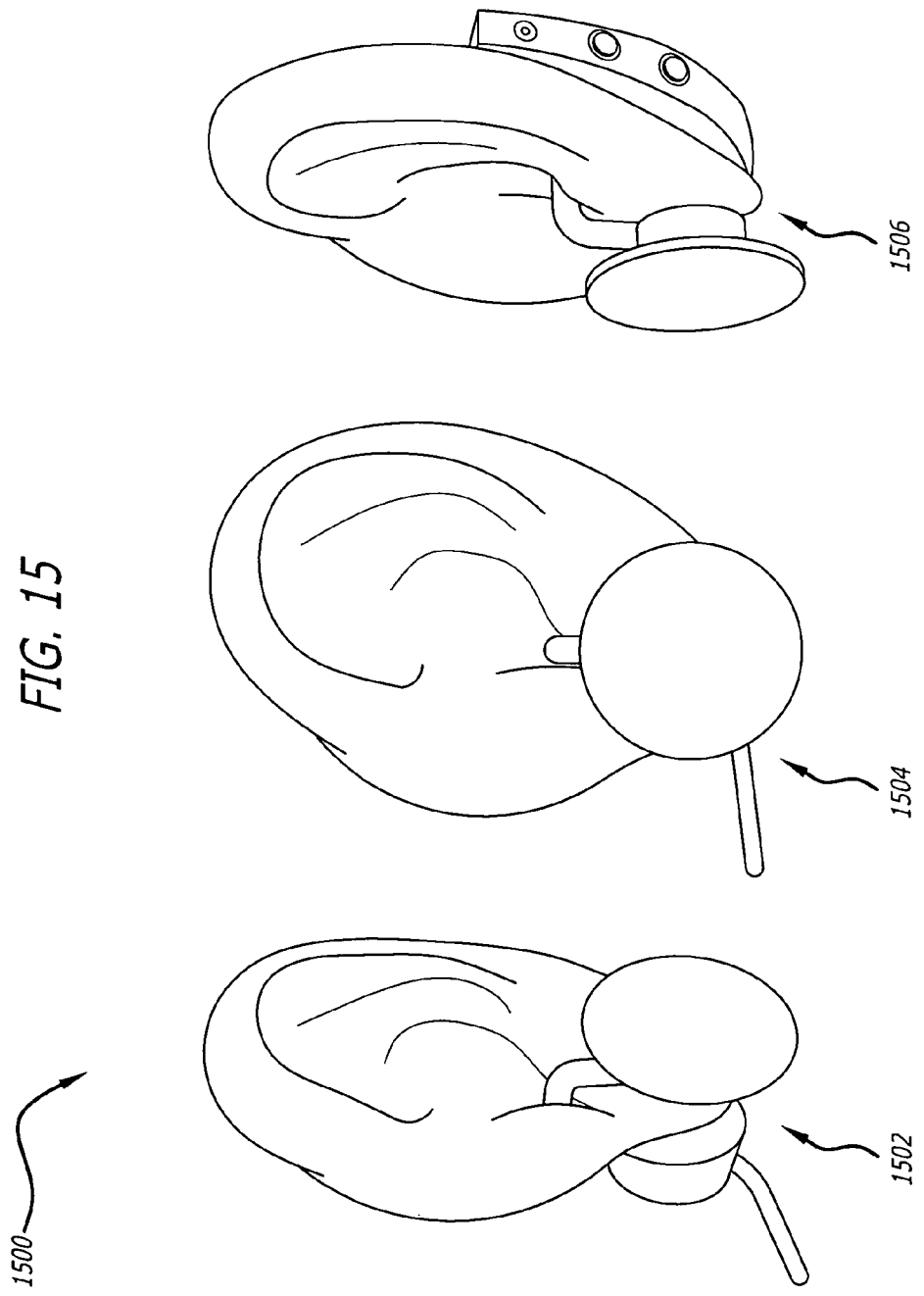
FIG. 15 illustrates three perspective views depicting the assembled device when worn by an individual.

FIG. 15 shows three perspective views depicting wearable wireless communication device 1500 when worn by an individual. The first view 1502 is an outward facing front view, as observed by an individual facing the wearer. The second view 1504 is a side facing view, as observed by an individual looking orthogonally toward the wearer. Third view 1506 is a rear view of the design. The ornamental cosmetic decoration may hide the rest of the wearable wireless communication device from view. In an optional embodiment, the decoration may include illuminated portion, for example LEDs, configured for receiving power through the serial circuit design.

It is noted that an identical main electronics enclosure can be employed in both the non-pierced ear and pierced ear configurations. Main electronics enclosure 205 (non-pierced ear) in FIG. 2 may be identical to main electronics enclosure 1205 in FIG. 12 (pierced ear). Such similarities can provide economies and benefits when producing the device(s). Further, for both non-pierced and pierced ear configurations presented, due to the construction of the components and the electrical connections provided, the main electronics enclosure mounts may be reversed, or in other words positioned on the other side of the main electronics enclosure, thereby providing the ability for the wearer to wear the device on his right or left ear. In such an arrangement, the wearer would position the main electronics enclosure behind a preferred ear. The wearer would insert the main electronics enclosure mount in an orientation such that the clip would be attachable to the chosen ear or the connecting segment would pass through a piercing in the chosen ear. The wearer could then assemble the rest of the components presented and use the device in either ear.

Figure 16:
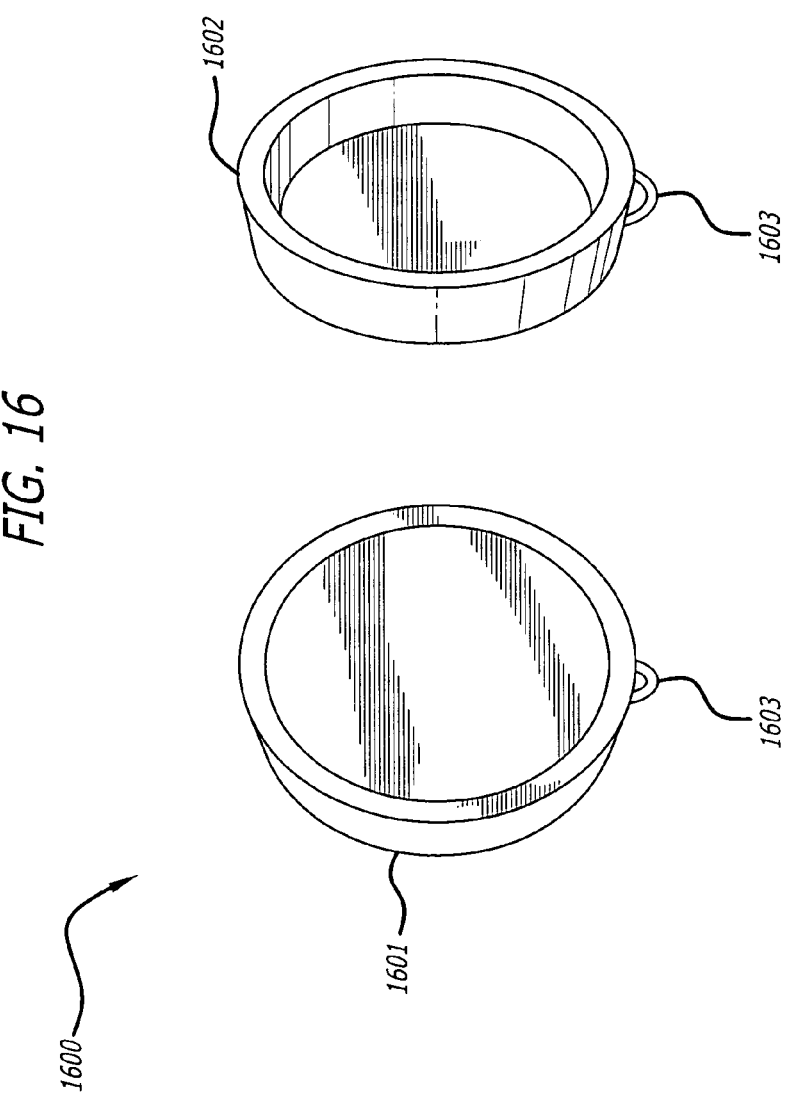
FIG. 16 shows an alternate ornamental decoration including a ring formed at the bottom.

FIG. 16 illustrates front and back views of a converter 1600 that may be employed as the ornamental decoration described herein. Front view 1601 shows the exterior while back view 1602 shows the female receiving portion that fits over the decorative mount. Ring 1603 provides the user with the ability to adorn the wearable wireless communication device with a hanging element, such as an earring. The hanging element may include a piece that slips though ring 1603, or adornment or ornamentation such as an earring may be permanently fastened to ring 1603, such as a hanging or dangling earring affixed to ring 1603.

Figure 17:
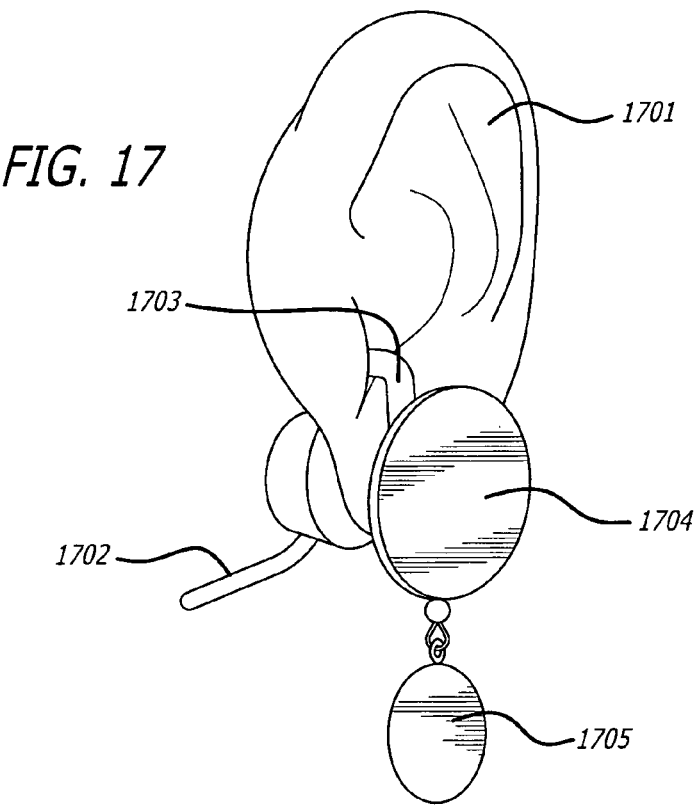
FIG. 17 illustrates the wearable design including the alternate ornamental decoration and additional ornamentation, namely an earring, worn by a user.

FIG. 17 illustrates an embodiment of the converter 1600 on the ear 1701 of the wearer, wherein components, including the main electronics enclosure, are positioned behind the wearer's ear and are thus not visible, with the exception of the microphone 1702, hearing tube 1703, converter/ornamental decoration 1704, and earring 1705 in this view.

Figure 18:
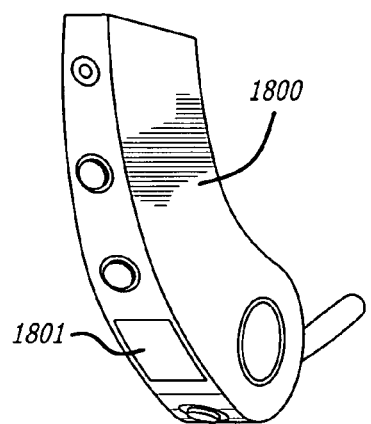
FIG. 18 is an alternate embodiment of the device that may incorporate a control interface in the form of a touchpad or trackpad.

FIG. 18 represents an alternate embodiment of the device 1800 which may incorporate a control interface 1801 in the form of a touchpad or trackpad. This control interface is a pointing device featuring a tactile sensor, a specialized surface that may translate the motion and position of a user's finger(s) to data, where the data may include a relative position on a screen. The control interface 1801 may also be sensitive to touch, force and/or pressure, and may interpret these and alter them into electrical signals that can be sent to the codec module 160 as seen in FIG. 1B. The codec module may then interpret these signals into data that can be sent wirelessly as part of the duplexed signal to communicate and control external devices, such as cellular phones, laptops, notebooks, tablet computing devices, environmental controls, gaming consoles, and the like.

Thus a wearable wireless communication device is provided, including a behind-the-ear main electronics enclosure housing wireless communication electronics, a main electronics enclosure mount engaging the behind-the-ear main electronics enclosure, an ear mount fitting the main electronics enclosure mount, and a decorative mount including a speaker. The decorative mount attaches to the ear mount and is configured to fit over an ear of a wearer, and signals are transmitted from the main electronics to the main electronics enclosure mount, to the ear mount, and to the speaker in the decorative mount and audio from the speaker is provided to the ear of the user. Pierced ear and non-pierced ear versions are provided, wherein the ear mount for the non-pierced ear version includes a clip that clips to the wearer's ear lobe. The pierced ear version includes a conductive post that passes through a piercing in the wearer's ear.

While primarily described herein with respect to an exemplary wearable wireless communication device, the invention and disclosure herein are not intended to be so limited. Note that while certain examples are provided herein, these examples are meant to be illustrative and not limiting as to the functionality of the present system and method. Other examples and implementations are possible and this document should not be limited by the examples presented. Other examples of maintaining a preferred position for a wireless communication device may be realized using the current design.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A wireless communication device comprising:
    a behind-the-ear main electronics enclosure housing wireless communication electronics and having a microphone provided therewith;
    a main electronics enclosure mount configured to engage and transmit signals received from the behind-the-ear main electronics enclosure;
    an ear mount configured to fit with the main electronics enclosure mount and transmit signals received from the main electronics enclosure mount; and
    a decorative mount housing a speaker, attached to the ear mount, and configured to be positioned over an ear of a wearer, the decorative mount housing configured to receive signals from the ear mount, convert the signals received to audio, and transmit the audio to the ear of the wearer;
    wherein the ear mount comprises one from the group consisting of a conductive element configured to pass through a piercing in the ear of the wearer and a clip configured to clip onto the ear of the wearer.

2. The wireless communication device of claim 1, further comprising a hearing tube connected to the speaker in the decorative mount and an ear bud connected to the hearing tube, the ear bud configured to be provided in the ear of the wearer.

3. The wireless communication device of claim 1, wherein the decorative mount is configured to receive an ornamental decoration.

4. The wireless communication device of claim 3, wherein the ornamental decoration comprises a ring configured to receive further ornamentation.

5. The wireless communication device of claim 1, wherein the conductive element comprises a conductive post configured to pass through the piercing in the ear of the wearer.

6. The wireless communication device of claim 5, wherein the conductive post is configured to be inserted into and removed from the main electronics enclosure mount, enabling the wearer to wear and remove the wireless communication device via the piercing.

7. The wireless communication device of claim 6, wherein the conductive post comprises a non-circular portion positioned proximate a tip of the conductive post, and wherein the main electronics enclosure mount comprises a similarly non-circular female opening configured to receive the non-circular portion of the conductive post.

8. The wireless communication device of claim 1, wherein the main electronics enclosure mount comprises at least one conductive strip located thereon, and the at least one conductive strip is configured to interface with conductive surfaces positioned within a female opening in the behind-the-ear main electronics enclosure.

9. The wireless communication device of claim 1, wherein the main electronics enclosure comprises controls for the main electronics.

10. The wireless communication device of claim 8, wherein the behind-the-ear main electronics enclosure female opening is configured to receive the electronics enclosure mount on either side such that the wearer can wear the wireless communication device on either a right ear or a left ear when assembled.

11. A wearable wireless communication device comprising:
    a behind-the-ear main electronics enclosure housing wireless communication electronics;
    a main electronics enclosure mount configured to engage the behind-the-ear main electronics enclosure;
    an ear mount configured to fit with the main electronics enclosure mount; and
    a decorative mount including a speaker, wherein the decorative mount attaches to the ear mount and is configured to fit over an ear of a wearer;
    wherein signals are transmitted from the main electronics to the main electronics enclosure mount, to the ear mount, and to the speaker in the decorative mount and audio from the speaker is provided to the ear of the user;
    wherein the ear mount comprises one from the group consisting of a conductive element configured to pass through a piercing in the ear of the wearer and a clip configured to clip onto the ear of the wearer.

12. The wearable wireless communication device of claim 11, wherein the behind-the-ear electronics enclosure comprises a microphone connected to the wireless communication electronics.

13. The wearable wireless communication device of claim 11, further comprising a hearing tube connected to the speaker in the decorative mount and an ear bud connected to the hearing tube, the ear bud configured to be provided in the ear of the wearer.

14. The wearable wireless communication device of claim 11, wherein the decorative mount is configured to receive an ornamental decoration.

15. The wearable wireless communication device of claim 14, wherein the ornamental decoration comprises a ring configured to receive further ornamentation.

16. The wearable wireless communication device of claim 11, wherein the conductive element comprises a conductive post configured to pass through the piercing in the ear of the wearer.

17. The wearable wireless communication device of claim 16, wherein the conductive post is configured to be inserted into and removed from the main electronics enclosure mount, enabling the wearer to wear and remove the wireless communication device via the piercing.

18. The wearable wireless communication device of claim 17, wherein the conductive post comprises a non-circular portion positioned proximate a tip of the conductive post, and wherein the main electronics enclosure mount comprises a similarly non-circular female opening configured to receive the non-circular portion of the conductive post.

19. The wearable wireless communication device of claim 11, wherein the main electronics enclosure mount comprises at least one conductive strip located thereon, and the at least one conductive strip is configured to interface with conductive surfaces positioned within a female opening in the behind-the-ear main electronics enclosure.

20. The wearable wireless communication device of claim 11, wherein the main electronics enclosure comprises controls for the main electronics.

21. The wearable wireless communication device of claim 19, wherein the behind-the-ear main electronics enclosure female opening is configured to receive the electronics enclosure mount on either side such that the wearer can wear the wireless communication device on either a right ear or a left ear when assembled.

22. A wearable wireless communication device comprising:
a behind-the-ear main electronics enclosure housing wireless communication electronics;
a main electronics enclosure mount configured to engage the behind-the-ear main electronics enclosure behind an ear of the wearer;
an ear mount configured to fit with the main electronics enclosure mount and configured to traverse an ear lobe of the ear of the wearer; and
a decorative mount including a speaker configured to engage the ear mount and be positioned in front of the ear of the wearer and provide audio to the ear of the wearer;
wherein the ear mount comprises one from the group consisting of a conductive element configured to pass through a piercing in the ear of the wearer and a clip configured to clip onto the ear of the wearer and is configured to conduct electrical signals from behind the ear of the wearer to in front of the ear of the wearer.

* * * * *